Sept. 12, 1939.　　　　　E. G. WATTS　　　　　2,172,918
REMOTE INDICATING AND CONTROL SYSTEM
Filed Nov. 27, 1934　　　3 Sheets-Sheet 3

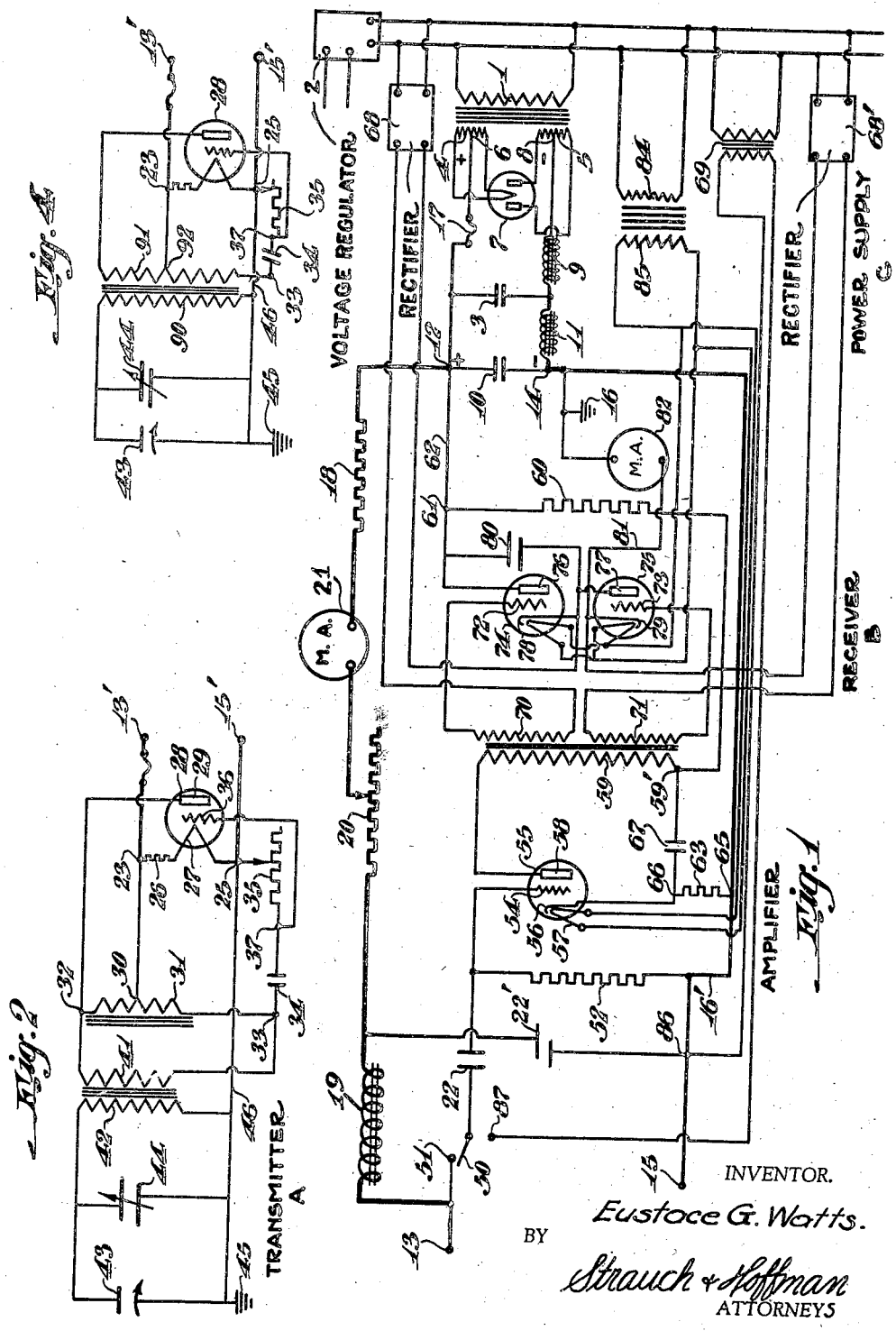

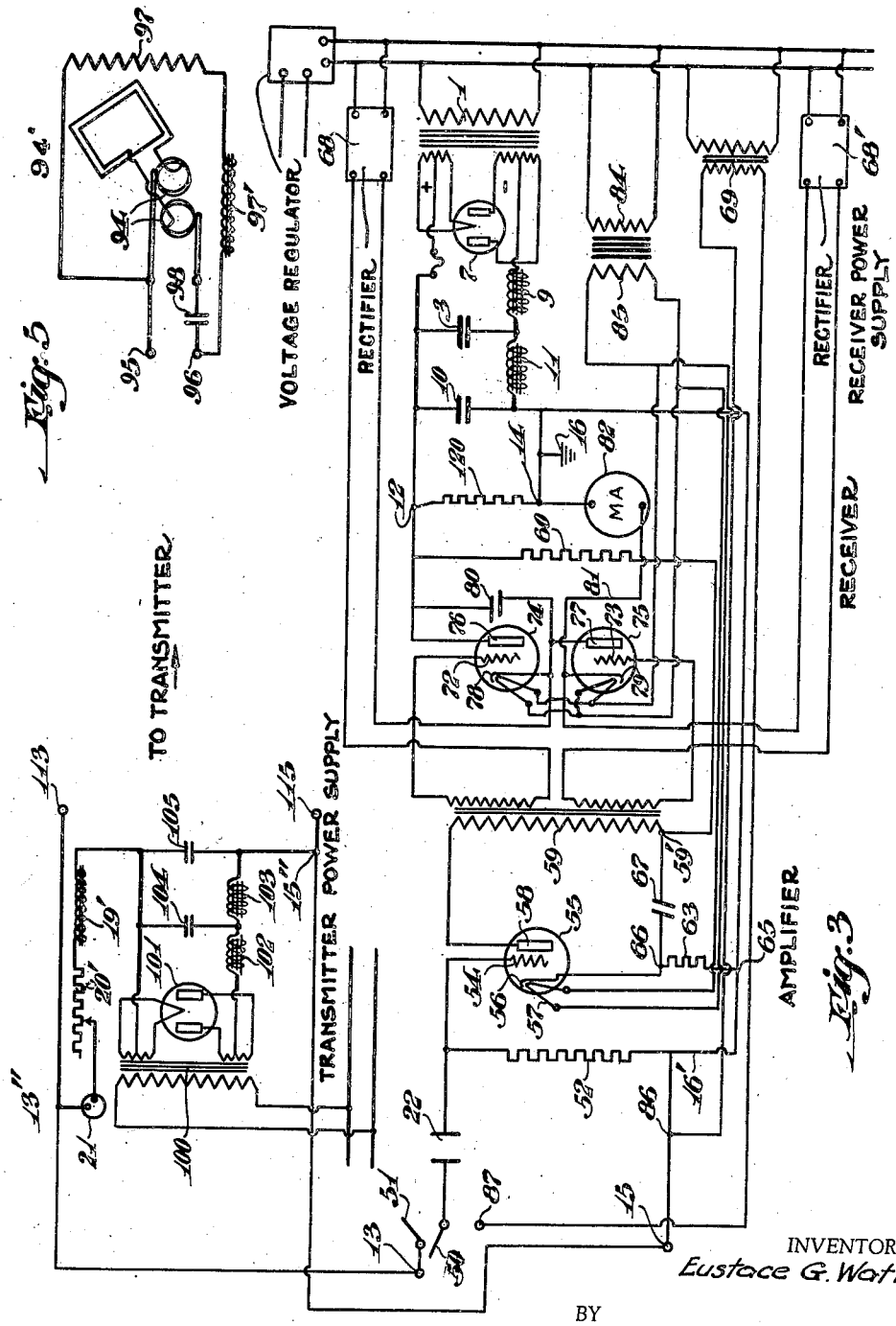

INVENTOR.
Eustace G. Watts.
BY
Strauch + Hoffman
ATTORNEYS

Patented Sept. 12, 1939

2,172,918

UNITED STATES PATENT OFFICE 2,172,918

REMOTE INDICATING AND CONTROL SYSTEM

Eustace G. Watts, Pittsburgh, Pa., assignor to Pittsburgh Equitable Meter Company, Pittsburgh, Pa., a corporation of Pennsylvania Application November 27, 1934, Serial No. 755,047

16 Claims. (Cl. 177—351)

This invention relates to a system for electrically indicating, recording, or controlling at a remote point variations of a quantity or magnitude, such as fluid pressures, liquid levels, energy, rate of flow and the like. More particularly, the invention relates to the measurement or recording of fluid pressures or flows at a point remote from the pressure point to be measured.

Telemetering systems have heretofore been proposed in which there is an oscillatory electrical circuit at the transmitter with means such as a reactance actuated by the value to be measured for varying the frequency of the oscillations of the circuit, and the changes in the frequency of the oscillatory potential are transmitted and impressed on a suitable indicating instrument at the receiver. To my knowledge such systems as heretofore constructed have the disadvantage that the source of electrical energy for the transmitter must be located at the transmitter. Also, as the transmission line has a certain capacity any changes therein due to various uncontrolled causes will affect the frequency of the transmitter. Where the pressure or rate of flow of inflammable fluids are to be measured such systems cannot be employed because of the fire hazard attendant on the use of high voltage currents of commercial power transmission lines. Also, it frequently happens that power is not available at the transmitter for its operation because of the isolated location of the transmitter.

Further, to my knowledge, prior systems of this type have had a limited measuring range due to the fact that the variable reactance at the transmitter must be made too large and cumbersome to be operative for indicating practical ranges, with the consequence that when a wide range of indication or extreme accuracy in reading is desired this reactance element must be made so large and heavy that the system loses its sensitivity and becomes unreliable as an indication of small changes in the value to be measured. If the size of the reactance element is not increased it is not possible to obtain a sufficiently wide range of operation to permit accurate reading of the scale on the indicating instrument located at the receiver.

According to the present invention, I provide a telemetering system comprising a variable frequency generator at the transmitter having means for varying the frequency thereof, conducting the frequency to a suitable metering receiver, and I block out or isolate the supply current from interfering with the receiver, and isolate the signalling current from the power supply. By this arrangement I am enabled to have the power supply for the transmitter located at the receiver, the power being conducted thereto over the same conductors which carry the oscillating signal potential from the transmitter to the receiver. Or, in a modification, a power supply is located at an intermediate point between the transmitter and receiver and furnishes power to the transmitter, the oscillating signal potential being returned over the same conductors as far as the power supply and thence to the receiver. Instead of recalibrating the receiver to permit its use in this modification I shunt a resistance across the power supply terminals of the receiver equal to the transmission line resistance and resistance of the transmitter. In a third modification the power supply for the transmitter is located adjacent thereto, the signalling potential being isolated therefrom as before, and the power supply likewise being isolated from the receiver.

In employing a vacuum tube oscillator at the transmitter I provide means for dividing the supply potential, utilizing a portion thereof in the plate-filament circuit, said means being in the path of the grid-filament oscillating current for producing an alternating potential difference, and I tap the signalling potential across said means. The direct current potential of the grid is adjustable for various circuit characteristics, and I provide a low reactance path in the oscillating grid-filament circuit which prevents flow of direct current therethrough but permits flow of the oscillating grid-filament current. I also provide means for compensating for the effect of the transmission line on the transmitter.

Further, I provide a transmitter comprising an oscillatory circuit and a reactance such as a condenser or an inductance actuated by the value to be measured for varying the frequency of the circuit, and I insert in said oscillatory circuit a means multiplying the reactance effect of the frequency varying means whereby, without increasing the size or weight of the frequency varying means or diminishing the accuracy thereof, the measuring range of the transmitter is increased. This transmitter can be employed in connection with the vacuum tube oscillator just described.

The modification in which the power supply is located at the receiver and is common to the receiver and transmitter, when used in connection with my improved oscillatory circuit above described, can be employed up to ranges of about ten miles over commercial telephone lines. For further ranges I prefer to locate the power supply for the transmitter any convenient distance therefrom up to about ten miles, and the receiver may be located one hundred miles or more from the transmitter. These ranges are increased, as for example, by using special wiring in place of commercial telephone lines or by using suitable amplifying devices at suitable points between the transmitter and receiver. The amplifier is coupled to the receiver in such manner that the amplifier requires a minimum signal potential to provide the required power for operating the receiver.

In the specific embodiment in which a condenser is used to vary the frequency of the oscillatory circuit including a thermionic valve at the transmitter, I inductively couple the secondary oscillatory circuit to the primary oscillatory circuit thereby dividing the reactance effect of the secondary oscillatory circuit and thus increase the measuring range of the transmitter without increasing the size of the condenser which is actuated by the value to be measured while retaining its accuracy and sensitivity. A common path is provided for the plate-filament and grid-filament oscillating currents, and the signalling potential is taken at the terminals of this path.

Accordingly, it is one object of the present invention to provide a telemetric or remote control system employing an oscillatory circuit at the transmitter which receives its source of electrical energy from a point remote therefrom.

Another object is to provide a telemetering system in which the power is conducted to the transmitter over the same wires that conduct the signalling potential to the receiver, the power current and signalling currents being isolated.

Another object is to provide means for compensating for the effect of the transmission line on the transmitter.

A further object is the provision of a transmitter of the oscillatory type in which the measuring range is increased without loss of sensitivity of the instrument and without destroying its accuracy.

Another object is the provision of an amplifier at the receiver, the output thereof being coupled to the receiver so that the amplifier will develop the required power for operating the receiver with a minimum signal potential.

Another object is the provision of an oscillator of the vacuum tube type employing a novel arrangement for supply current and for tapping the oscillating signalling current.

Another object is the provision of a receiver including a frequency meter and having means for checking the accuracy thereof at a predetermined frequency.

These and various other objects of the invention will be apparent from the following description and appended claims taken in connection with the accompanying drawings in which:

Figure 1 is a wiring diagram of a receiver having the power supply contiguous thereto;

Figure 2 is a wiring diagram of a preferred embodiment of the transmitter;

Figure 3 is a wiring diagram in which the power supply for the transmitter is located at some intermediate point between the transmitter and receiver;

Figure 4 is a wiring diagram of a modified transmitter;

Figure 5 shows a modified transmitter for producing a variable frequency potential;

Figure 6:
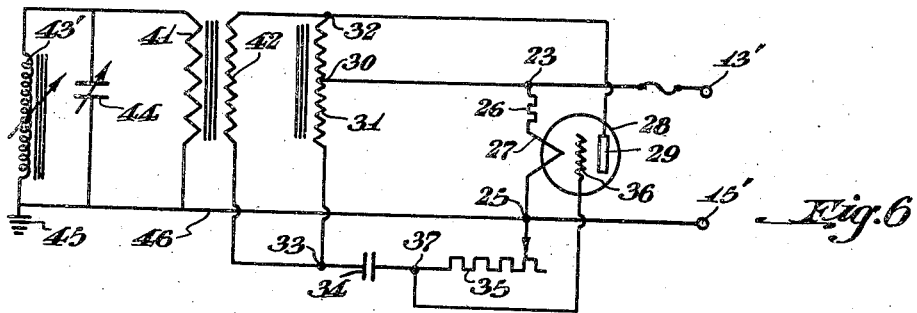
Figure 6 is a wiring diagram of a modified transmitter employing a variable inductance.

Referring to the drawings, the modification shown in Figures 1 and 2 comprises a transmitter A, a receiver B, and a power supply C, the latter being located at the receiving end of the system. This modification is particularly useful when the transmitter is located at some remote section in which a source of high potential electrical power is not available, or in oil fields where high potential lines are not permitted, and the arrangement is such that direct current is transmitted to the transmitter over the same telephone lines which return the alternating current signal of the transmitter to the receiver.

*The power supply*

The power supply receives a regulated alternating current from any suitable source through a voltage regulator 2 which is converted into direct current by means including a transformer 1 and full wave rectifier of any suitable type. In the modification shown a secondary winding 4 of this transformer is connected to the cathode or filament of the vacuum tube rectifier 7 for heating the same, and the secondary winding 5 is connected at its terminals to the anodes or plates thereof. The secondary windings 4 and 5 are tapped at their respective centers 6 and 8 and these taps constitute the positive and negative output terminals respectively of the rectifier. The positive terminal 6 is connected to one terminal of capacitor 3 and the negative terminal 8 is connected to one end of inductor or reactance 9, the opposite terminal of reactance 9 being connected to the other terminal of capacitor 3. The capacitor or condenser 3 and the reactance 9 provide a smoothing action to the current supplied by the rectifier to the point where it is desired to apply the direct current. Further smoothing of the direct current is provided by the capacitor 10 and a reactance 11 which repeats this process to insure maximum smoothing action, or, in this case, provide a pure non-pulsating direct current available for application from the points 12 and 14 to the transmitter A, to the receiver B, and to the amplifier when used. A safety fuse 17 is inserted on the output side of the rectifier tube.

The receiver terminals 13 and 15 are connected to the transmitter terminals 13' and 15' respectively by the two wires of a telephone line, the terminals 15 and 15' being grounded by a wire 16' to the metal case of the receiver as indicated at 16. The direct current is transmitted over the telephone lines to the positive terminal 13' and negative terminal 15' at the transmitter A. (Figure 2.) The potential of the positive transmitter terminal 13' of the telephone line is adjusted to the proper value by means of a variable resistance 20 in series with a fixed resistance 18, an inductance 19 and an ammeter 21, the meter 21 being used to provide a visible indication of the current so that resistance 20 can be manually adjusted to produce the desired potential at the positive transmitter terminal 13'. Inductance 19 provided a high impedance to prevent the oscillating signal potential returned from the transmitter over the telephone line from being short circuited through capacitor 10, and the capacitor 22 blocks the direct current supplied to the transmitter so as to eliminate its influence on the receiver input circuit. Condenser 22' completed the alternating current circuit at the receiving end of the transmission line by by-passing resistors 18 and 20 and ammeter 21.

*The transmitter*

The direct current potential difference impressed across terminals 13' and 15' at the transmitter is impressed across the points 23 and 25, a path of suitable resistance 26 of proper value being provided for heating the cathode or filament 27 of the thermionic valve 28 which is of the audion type. The plate 29 of audion 28 receives direct current potential from point 23 connected to the mid point 30 of an inductance 31, one outer terminal 32 thereof being connected to the plate 29. A direct current potential is applied to grid 36 through point 25, adjustable resistance 35 and point 37. The condenser 34 in the oscillating grid-filament circuit blocks out direct current flow therein and provides a path of low impedance for the oscillating grid-filament potential. The plate-cathode alternating current flows through resistor 26, tap 30, tap 32 and plate 29, and the grid-cathode alternating current flows through resistor 26, tap 30, tap 33, condenser 34, tap 37 and grid 36, the plate-cathode alternating current and grid-cathode alternating current both flowing through resistor 26. In the modification shown in Figure 2, the inductances 31 and 41 are in parallel, and a variable condenser 43 is connected across the terminals of inductance 42 coupled to inductance 41. Adjustable condenser 44 is connected in parallel with variable condenser 43 and the combined capacitance effect of the condensers 44 and 43 can be accurately and delicately adjusted for calibration by properly setting the condenser 44.

It will be seen that when the oscillation set up charges capacitor 34 to maximum oscillating potential, the alternating grid-filament current of the audion 28 is at a maximum and the alternating plate-filament current also is at a maximum. As the charge on condenser 34 varies the alternating grid-filament and plate filament currents likewise vary, and the alternating potential across the common current path 26 likewise changes, and the alternating current potential across the points 23, 25 is the signalling potential impressed on the telephone transmission line. The plates of condenser 43 are adapted to be mechanically operated in any suitable manner by the pressure, liquid level, or other quality to be measured to thereby vary its capacity. This variation in capacity varies the frequency of the oscillations across terminals 23, 25.

The secondary transmitter circuit comprises condensers 43 and 44 and inductance 42, this circuit being shown inductively coupled to the grid-filament and plate-filament circuits, but it will be understood that the secondary transmitter circuit may be coupled to either one of them. I have discovered that the capacity effect of the condenser 43 in the secondary circuit appears in the grid-plate filament circuit as a divided reactance effect, the division being as the square of the coil ratios of inductances 42 to 41. As shown in Figure 2, the inductance 41 has a smaller number of turns than inductance 42, and therefore steps up the alternating potential across points 32, 33, to a higher value across capacitor 43. This permits the use of a small light weight condenser 43 which is very sensitive and accurate. The ground 45 of the transmitter is connected through the wire 46 to the point 25 and serves as a common ground for the receiver and transmitter.

*The receiver*

The oscillating potential across terminals 13' and 15' of the transmitter is transmitted across the telephone lines to the receiver terminals 13 and 15, and with the switch 50 connected at 51, the signalling potential is impressed across capacitor 22 to the amplifier audion 55. This audion which may be part of the receiver, preferably is of the indirectly heated type, the cathode 56 being heated by a filament 57 connected in a suitable manner with a winding 85 coupled to a winding 84 from which the heating current is obtained. The power supply terminal 12 provides a positive potential to anode 58 through wire 62, connected at 61 with resistance 60, which in turn is connected to the terminal 59' of primary winding 59, the circuit being completed through audion 55, resistance 63 and wire 16' to the point 14. The cathode 56 therefore is biased positive with respect to ground an amount equal to the potential difference across the terminals 65 and 66 of resistance 63 and is positive with respect to grid 54. Resistance 52 provides a return path for the grid-filament direct current. The potential difference across the terminals 65 and 66 preferably is selected so that the grid potential changes in grid 54 due to the oscillating signal potential produce a lineal change in the plate current. Condenser 67 acts as a by-pass capacitor providing a return path of low reactance for the amplified alternating current component of the cathode-plate current passing through the primary coil 59. The signal potential difference across resistance 52 is impressed on grid 54, and as it varies the amplified cathode-plate alternating current of the audion 55 is correspondingly varied in known manner.

The alternating current through the primary 59 induces in the secondary coils 70 and 71, which have identical characteristics, alternating potentials which are transmitted to the grids 72 and 73 respectively of the audions 74 and 75. With the receiver operating at optimum efficiency the grid-cathode circuits of audions 74 and 75 consume power which is supplied by the plate circuit of amplifier tube 55. The transformer consisting of windings 59, 70 and 71 has a mutual inductance such that the impedance of the grid-cathode circuits of audions 74 and 75 as reflected in the amplifier plate circuit is equal at the frequency range at which the transmitter operates to the internal plate impedance of audion 55. Under these conditions the amplifier tube requires a minimum signal potential to provide the required power for operating the receiver. The audions 74 and 75 are preferably of the indirectly heated cathode type and are heated by current supplied from winding 85. The anodes 76 and 77 of audions 74 and 75 are connected to opposite sides of capacitor 80. The cathodes 78 and 79 are biased at the correct positive potential relative to the grids of their respective audions by means of suitable direct current sources of proper potential which may be batteries or rectifiers of suitable characteristics. Such combined transformers and rectifiers shown at 68 and 68' receiving their power from a suitable alternating current source.

The grid 72, which receives its potential from secondary winding 70, is excited 180° out of phase with grid 73 which receives its potential from secondary winding 71. Cathode 78 of audion 74 is connected to plate 77 of audion 75 to maintain the potentials on cathode 78 and plate 77 equal. When the grid 73 is positive with respect to the cathode 79 the cathode-plate current flows in audion 75 to charge capacitor 80. On the next half cycle when the grid 72 of audion 74 becomes positive and grid 73 becomes negative the condenser 80 discharges through the plate 76 and cathode 78 of audion 74. During the charging cycle of capacitor 80 the current flow through audion 75 passes through and is indicated on milliammeter 82. The average pulsating charging current to capacitor 80 as indicated by milliammeter 82 bears a definite relation to the frequency of the signal current so that changes in frequency of the signal current caused by variations of condenser 43 at the transmitter are indicated by the meter 82. This meter 82 may be calibrated in suitable units such as pounds pressure, or linear units to give a proper indication of the quantity to be measured. I have found that with a given type of tube at 74 and 75 there is an optimum relation between the direct current plate and grid voltages, and by suitable adjustment of the plate potential across terminals 12 and 14 and of the grid-cathode potentials at 68 and 68' the maximum current is obtained, at a given frequency, through the milliammeter 82 for a given input to the receiver.

Provision is made for testing the receiver. The transformer 69 supplies an alternating current of known frequency and predetermined potential to the terminals 86 and 87, and by connecting switch 50 with terminal 87 and observing the reading of the indicating instrument 82 it can be determined whether the receiver is correctly functioning.

In a telephone line as ordinarily connected and operated, the line is terminated in an impedance of a value equal to the characteristic impedance of the line. However, in the present invention the transmission line is terminated by inductance 19 and condenser 22' which complete the signal current circuit, and as there is no matched terminal impedance the line has a capacitive reactance. By not using a matched terminal impedance the attenuation of the transmission line, i. e., the line loss, is smaller. However, in this arrangement the transmission line circuit composed of inductance 19, the transmission line and condenser 22' assumes a large phase angle. As is well known, a vacuum tube oscillator operates at that frequency for which the total phase angle of the circuits is zero. Since the phase angle of the circuit composed of resistance 26 and filament 27, which circuit is in parallel with the transmission line circuit, ordinarily is not zero, the primary oscillatory circuit composed of inductance 31 and the resultant capacitance of coupled inductance 41 must oscillate with an equal and opposite phase angle. A change in the phase angle of the circuit including resistance 26 and filament 27 therefore causes a corresponding change in frequency in the primary oscillatory circuit such that the total phase angle is restored to zero. The impedance of the transmission line which is determined by its length and other factors therefore affects the frequency of the transmitter through its effect on the phase angle in the circuit composed of resistance 26 and filament 27.

When the transmitter is calibrated at the factory a simulated telephone line may or may not be connected between the terminals 15, 15' and 13, 13'. If no simulated line is used the only reactive impedance shunting resistance 26 and filament 27 is inductance 19 in series with condenser 22'. This impedance is high so that under such conditions of calibration the phase angle in circuit 26, 27 is close to zero. Now, when the apparatus is installed in the field and a telephone line is connected across terminals 15, 15' and 13, 13', or a simulated telephone line is used for calibration, the phase angle in circuit 26, 27 increases due to the low impedance of the transmission line circuit so that the frequency of the transmitter shifts from its calibrated point.

However, I found that if the inductance 19 is set at a value such that it is anti-resonated by the line within the range of frequency employed, the impedance of the resistance 26 is raised and the phase angle thereby decreased to a minimum. The nearer this phase angle is to zero the smaller will be the effect on the frequency of the transmitter when a different transmission line is used. Therefore the inductance 19 is adjusted and set in the factory at its anti-resonated value with a simulated line connected.

Direct current flows from filament 27, through point 25, resistance 35 and point 37 to grid 36, and its path is completed through the tube. The potential between grid 36 and filament 27 is substantially that between points 37 and 25, so that when resistance 35 is varied the grid-filament potential is changed. This in turn influences the plate-filament direct current. The permeability of the iron core of inductance 31 is determined by the plate-filament direct current flowing through inductance 31, and changes in this current as produced by adjustment of resistance 35, consequently affect the inductance of winding 31 and hence the oscillating frequency of the transmitter. The effect of adjusting resistance 35 on the direct current potential of grid is not critical, and this adjustment therefore can be used to adjust the inductance of winding 31 within certain limits.

In calibrating the transmitter it is connected to the receiver and the condenser 43 is set at the zero limit of its movement and resistance 35 is adjusted until the receiver indicates zero. The adjustment of condenser 44 has a negligible effect on the frequency of the circuit at the zero setting of condenser 43 because the capacity of condenser 44 is but a small fraction of the capacity of condenser 43 at that setting. However, adjustment of resistance 35 cannot correct the calibration of the transmitter at its high range because the resistance 26 has a greater phase angle at the higher frequencies than at the lower frequency corresponding to zero on the receiver scale. Therefore, for calibration at the high range of the scale the condenser 43 is set at the uppermost limit of its range of movement and condenser 44 is adjusted to the point at which the receiver indicates the uppermost limit of the scale. This adjustment corrects for linear changes in the phase angle of resistance 26 with changes of frequency, and non linear changes are eliminated as much as possible by having the artificial telephone line correspond as nearly as possible to the actual line used in the field.

Operation

The operation of the apparatus will now be described. Direct current is supplied to points 12 and 14 from the transformer 1 and full wave rectifier tube 7, the direct current taps being located at the points 6 and 8, and the inductances 9, 11, and condensers 3 and 10 serving to smooth out the direct current supply. The transmitter A (Figure 2) is supplied with direct current at the points 13' and 15' from the points 12 and 14 respectively at the power supply, this direct current being transmitted to the transmitter over the same telephone lines which return the alternating current potential from the transmitter to the receiver. By observing the flow of current through the ammeter 21 and adjusting the resistance 20 to a suitable value, the potential transmitted to the points 13' and 15' can be adjusted to the proper value. The flow of current across the points 23 and 25 through resistance 26 and filament 27 is utilized to heat the cathode 27 of audion 28.

The capacitor 44 is adjusted to a fixed value when the instrument is calibrated and remains unchanged during operation, and it will be seen that changes in the capacity of condenser 43 which is actuated by any suitable pressure responsive means or similar device controls the oscillating frequency of the transmiter as previously described.

The alternating potential is tapped at the points 23, 25 in the common plate-filament and grid-filament path and constitutes the alternating signal potential which is transmitted back over the telephone line to the points 13 and 15 at the receiver. With the switch 50 connected at 51, the oscillating signal potential passes through the condenser 22, which however does not allow passage of the direct current from the rectifier tube 7, to the amplifier tube 55. The oscillating potential is amplified in known manner by audion 55, and the amplified oscillatory signal current is divided by the primary inductance 59 and coupled secondary inductances 70 and 71 into two current paths 180° out of phase. The audions 74 and 75 have their cathode-anode interconnected respectively, and the pulsating cathode-anode direct current of audion 75 passing through condenser 80 is transmitted through the milliammeter 82 which is suitably calibrated to read directly in units of pressure, lineal dimensions, or other suitable value.

Modifications

In the modification shown in Figure 3, wherein like parts are designated by like numerals, the transmitter is supplied with power from an intermediate point which may be located any suitable distance up to about ten miles from the transmitter. The receiver may be located at practically any distance from the point of application of the power supply. In this modification regulated power is supplied to a transformer 100, this power being rectified by a vacuum tube rectifier 101 and smoothed out by reactances 102, 103, and condensers 104 and 105. The direct current potential is cut down to a suitable value for the transmitter by adjustment of the resistance 20' as previously described, and inductance 19' prevents the signal potential from being short circuited through capacitor 105. Inductance 19', like inductance 19, can be used to compensate for the effect of the line on the frequency of the transmitter. The terminals 113 and 115 of the power supply are located up to about ten miles from the transmitter and are connected thereto over telephone lines, and the receiver terminals 13 and 15 are connected to terminals 13" and 15" at the transmitter power supply by telephone lines. The receiving circuit is the same as previously described, and to eliminate recalibration of the receiver in this modification a resistance 120 is shunted between points 12 and 14, this resistance being equal to the combined resistance of the circuit shown in Figure 1 from the points 12 and 14 to and including the transmitter, and back again to the receiver.

In the modification shown in Figure 3 the construction and operation of the receiver is quite similar to that shown in Figure 1. In this construction the direct current output of the full wave rectifier tube 7 is not transmitted to the transmitter. It serves to energize amplifier audion 55 and supply current for charging condenser 80 in the same manner as in the modification shown in Figure 1. In order to permit the same receiver to be used with either modification shown in Figures 1 and 3 and eliminate separate calibration thereof, a resistance 120 is placed across the terminals 12 and 14. This resistance is of sufficient value to produce a potential drop across its terminals equal to that which would be produced in Figure 1 by the resistance 18, reactance 19, resistance 20, ammeter 21, the telephone lines and transmitter, and the leads back again to the points 12 and 14. The terminals 13 and 15 of the receiver are connected to the points 13" and 15" of the power supply by telephone lines. The direct current from the power supply is transmitted from the terminals 113 and 115 over telephone lines to the transmitter A (Figure 2) at the points 13' and 15' respectively, and the oscillating potential signal current is returned over the same telephone lines to the points 113 and 115 at the power supply, from thence to the points 13 and 15 at the receiver, and as previously explained, produce the proper reading on the miliammeter 82.

In the modified transmitter shown in Figure 4 the inductance 90 has more turns than inductance 91, and the point 23 is connected to the mid point 92 of inductance 91. The operation of this transmitter is similar to that shown in Figure 2, the elimination of inductance 31 providing a more simple construction.

In the modification shown in Figure 5 a variable speed alternating current generator comprising a pair of slip rings 94 and an armature is operated by the quantity to be measured in any suitable manner. Power is transmitted through the telephone lines to the terminals 95 and 96 and thence to the field 97 to excite the same. The generated frequency passes through condenser 98 back to the transmission line, this condenser serving to block out the direct current power supply and the choke coil 97' blocking the generated frequency from the field. Changes in the speed of generator 94 produce a corresponding change in the alternating current frequency impressed on the telephone line which can be measured by the receiver shown in Figure 1, or any other suitable type of receiver.

In the modification shown in Figure 6 a variable inductance 43' is employed in place of the condenser 43 shown in Figure 2, like parts of this transmitter being correspondingly numbered.

It will be noted that the coupled inductances 41 and 42 are reversed in this modification, and the reversal of these inductances produces a multiplied reactance effect in the primary circuit. I use the term multiplied reactance effect throughout the specification and claims to denote generically either a division or multiplication of the reactance effect, as division can be considered as an inverse multiplication.

Figure 7:
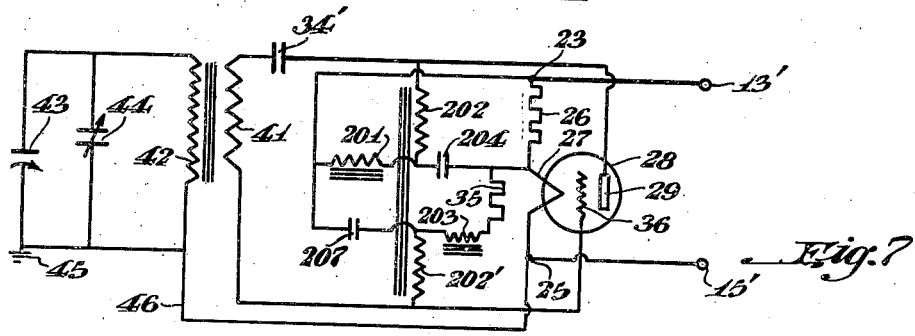
Figure 7 is a wiring diagram of a modified transmitter, the signalling potential being tapped in the grid-filament circuit.

In the modification shown in Figure 7, oscillating grid-filament and plate-filament currents are segregated and the potential drop caused by the grid-filament current is utilized to impress an alternating potential on the transmission line. The direct current supply is connected across positive and negative terminals 13' and 15' respectively, and the positive potential is applied to the plate 29 through inductors 201 and 202 and returned to the negative terminal 15' through the tube 28 and the filament 27. Condenser 34' blocks direct plate potential from the grid circuit. The grid direct current flows through inductances 202' and 203 and resistor 35 to filament 27, it being confined to this path by condenser 207. The oscillating plate-filament current passes through inductance 202, condenser 204, to the filament 27, the inductance 201 confining the current to this path. The oscillating grid-filament current passes through inductance 202', condenser 207 and resistor 26 to the filament 27, the inductances 203 and 201 confining the current to this path. The alternating potential difference across resistance 26 in the grid circuit is impressed on the terminals 13' and 15' to the transmission line as the signal potential.

Figure 8:
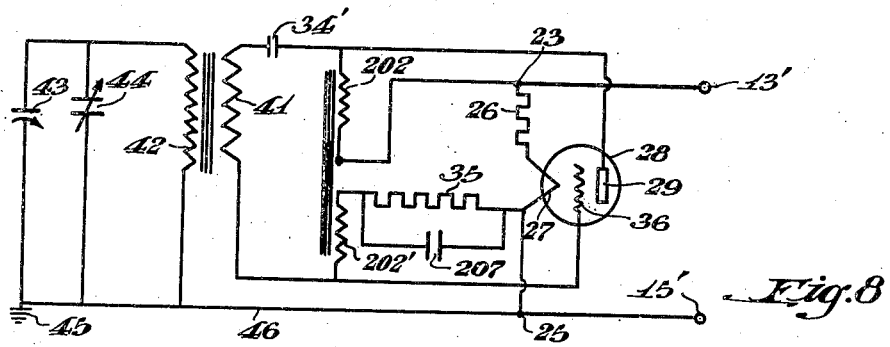
Figure 8 is a wiring diagram of a modified transmitter, the signalling potential being tapped in the plate-filament circuit.

In the modification shown in Figure 8, the oscillating grid-filament and plate-filament currents are segregated and the potential drop caused by the plate-filament current is utilized to impress an alternating potential on the transmission line. This arrangement gives the greater range of frequency change for a given capacity change. The direct current supply is connected across positive and negative terminals 13' and 15' respectively, and the positive potential is applied to the plate 29 through inductance 202, and returns to the negative terminal 15' through the tube 28 and filament 27. The grid direct current flows through inductance 202' and resistor 35 to filament 27. The oscillating plate-filament current passes through inductance 202 and resistance 26 to the filament 27. The oscillating grid-filament current passes through inductance 202', and condenser 207 to the filament 27. Condenser 34' blocks direct plate potential from the grid circuit. The alternating potential difference across resistance 26 in the plate circuit is impressed on the terminals 13' and 15' to the transmission line as the signal potential.

Figure 9:
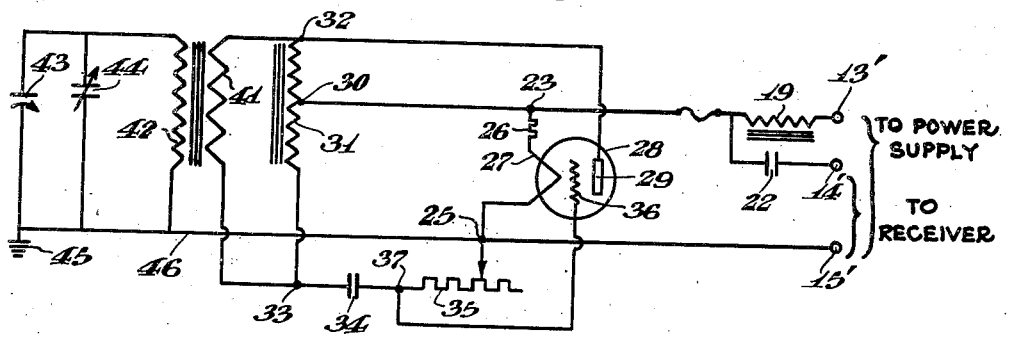
Figure 9 is a wiring diagram of a modification showing a three wire system, the power supply and signal potential being segregated at the transmitter.

Figure 9 shows a modified transmitter employing a three wire system, the signalling potential and the power supply being isolated at the transmitter. In this modification the power is supplied to terminals 13' and 15', and the oscillating signal output is tapped at the terminals 14' and 15', the inductance 19 serving to isolate the signal potential from the power supply, and the capacitor 22 serving to isolate the supply current from the signal output circuit. This system is used with a receiver and power supply like that shown in Figure 1 or 3, the inductance 19 and condenser 22 however being omitted as their equivalent is employed at the transmitter.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a telemetric system, a transmitter including a vacuum tube oscillator for generating an oscillating signal potential, a direct current power supply, conductors for supplying direct current from said power supply to said oscillator, a reactance operated by the value to be measured for varying the frequency of the oscillating signal potential, a receiver including a frequency measuring device, said conductors being connected to the oscillating output circuit of said transmitter and transmitting the oscillating signal potential to the receiver, a condenser at the receiver for isolating the supply current carried by said conductors from the receiver, and a relatively great inductance for isolating the signal potential from the power supply, said inductance being adjustable to compensate for the shift in phase angle of the transmitter due to the impedance of the conductors.

2. In a telemetric system, a transmitter including a variable oscillation generator for producing an oscillating signal potential, a direct current power supply, conductors for supplying direct current from said power supply to said generator, a reactance operated by the value to be measured for varying the frequency of the oscillating signal potential, a receiver including a frequency measuring device, said conductors being connected to the oscillating output circuit of said transmitter and transmitting the oscillating signal potential to the receiver, means for isolating the supply current carried by said conductors from the receiver, and means for isolating the signal potential from the power supply, said latter means being adjustable to compensate for the shift in phase angle of the transmitter due to the impedance of the conductors.

3. In a telemetric system, a transmitter including a vacuum tube oscillator for producing an oscillating signal potential, means for supplying current to said oscillator, a frequency measuring receiver, conductors for impressing the alternating signal potential on the receiver, and an inductance effectively in shunt with the output circuit of said transmitter for compensating for the shift in phase angle at the transmitter due to the impedance of the conductors.

4. A transmitter including a vacuum tube oscillator, means for supplying current to said oscillator, means providing a common path for the plate-filament and grid-filament oscillating currents, a transmission line, and means for impressing the alterating potential developed across said common path upon said transmission line.

5. A transmitter including a vacuum tube oscillator, means for providing current to said oscillator, means providing a common path for the plate-filament and grid-filament oscillating currents, means for varying the frequency of the alternating potential across said second named means, a transmission line, and means for impressing the alternating potential developed across said second named means upon said transmission line.

6. In a transmitter including a vacuum tube oscillator, means for supplying direct current to said oscillator, transmission conductors, means in the path of the plate-filament oscillating current for dividing the alternating potential difference, a portion of the alternating potential being utilized to maintain oscillation of the oscillator, and the remainder of the alternating potential being impressed on said transmission conductors.

7. In a telemetric system, a transmitter including a vacuum tube oscillaltor, a voltage divider providing a common path for the plate-filament and grid-filament oscillating current, means connected across said voltage divider for supplying power to the oscillator, a frequency measuring receiver, and conductors connected across said voltage divider for transmiting the oscillating potential across said voltage divider to the receiver.

8. A transmitter including a vacuum tube oscillator, means for supplying direct current to said oscillator, means providing a common path for the plate-filament and grid-filament oscillating currents, means blocking direct current to the grid of said tube and providing a low impedance path for oscillating current to the grid, a transmission line, and means for impressing the alternating potential developed across said common path upon said transmission line.

9. In a transmitter including a vacuum tube oscillator, a power supply, a transmission line, means for supplying direct current from the power supply to said oscillator, means providing a common path for the plate-filament and grid-filament oscillating currents, means for impressing the alternating potential developed across said common path upon the transmission line, and means for isolating the alternating current signal potential from the power supply means.

10. In a telemetric system including a vacuum tube oscillator, a power supply, conductors for supplying direct current from the power supply to said oscillator, means providing a common path for the plate-filament and grid-filament oscillating currents for producing an alternating potential difference, means for impressing the alternating potential developed across said means upon said conductors, means for isolating the signal potential from the conductors carrying direct current, means dependent upon a value to be measured for varying the frequency of the alternating signal potential, a receiver including a frequency measuring device for receiving the signal potential from said conductors, and means for isolating the supply current carried by the conductors from the receiver.

11. A transmitter including a vacuum tube oscillator, means for supplying current to the oscillator, means for dividing the supply potential and utilizing a portion thereof for heating the filament of said tube, said dividing means providing a common path for the plate-filament and grid-filament oscillating currents, means dependent on a value to be measured for varying the frequency of the alternating potential across said common path, means for adjusting the grid potential to regulate the plate current at a predetermined value, means blocking direct current to the grid of said tube and providing a low impedance path for oscillating current to the grid, a transmission line, and means for impressing the alternating potential developed across said common path upon said transmission line.

12. A transmitter including a main oscillatory circuit having a vacuum tube, means for supplying current to said circuit, a secondary oscillatory circuit coupled thereto to produce a multiplied reactance effect therein, said secondary circuit including a variable reactance, means to vary said reactance to vary the frequency of the main oscillatory circuit, means providing a common path for the plate-filament and grid-filament oscillating current, a transmission line, and means for impressing the alternating potential developed across said common path upon said transmission line.

13. A transmitter including a vacuum tube oscillator, means for supplying direct current to said oscillator, means in the path of the plate-filament oscillating current for dividing the alternating potential difference, a secondary oscillatory circuit inductively coupled to the plate-filament circuit to produce a multiplied reactance effect therein, transmission conductors, a portion of the alternating potential in the plate-filament circuit being utilized to maintain oscillation of said oscillator, the remainder of the alternating potential being impressed on said transmission conductors.

14. In a telemetric system, a transmitter including a vacuum tube oscillator, a voltage divider providing a common path for the plate-filament and grid-filament oscillating currents, means connected across said voltage divider for supplying power to the oscillator, means dependent on a value to be measured for changing the frequency of the alternating potential across said path, a frequency measuring receiver, and conductors connected across said voltage divider for impressing the alternating potential across said path on the receiver.

15. In a telemetric system, a transmitter including a main oscillatory circuit having a vacuum tube, a secondary oscillatory circuit coupled thereto to produce a multiplied reactance effect therein, said secondary circuit including a variable reactance adapted to be varied by a quantity to be measured to vary the frequency of the signalling potential in the main oscillatory circuit, a frequency meter, and conductors for impressing the signalling potential on the frequency meter.

16. In a telemetric system, a transmitter including a main oscillatory circuit having a vacuum tube, means for supplying current to said circuit, a secondary oscillatory circuit coupled thereto to produce a multiplied reactance effect therein, said secondary circuit including a variable reactance, means dependent on a quantity to be determined to vary said reactance to vary the frequency of the signalling potential in the main oscillatory circuit, means for isolating the signal potential from the power supply, a frequency meter, and conductors for impressing the signalling potential on the frequency meter.

EUSTACE G. WATTS.